(12) United States Patent
Cheo et al.

(10) Patent No.: US 6,801,549 B1
(45) Date of Patent: Oct. 5, 2004

(54) MODAL DISCRIMINATING AND LINEARLY POLARIZED FIBER LASERS

(75) Inventors: Peter K. Cheo, Waterford, CT (US); George G. King, Storrs, CT (US)

(73) Assignee: PC Photonics Corporation, Waterford, CT (US)

( * ) Notice: Subject to any disclaimer, the term of this patent is extended or adjusted under 35 U.S.C. 154(b) by 321 days.

(21) Appl. No.: 09/648,918

(22) Filed: Aug. 25, 2000

(51) Int. Cl.[7] .................................................. H01S 3/30
(52) U.S. Cl. .............................................. 372/6; 372/68
(58) Field of Search ............................. 372/6, 72, 109, 372/40, 29.016, 357, 96.33; 385/123–126

(56) References Cited

U.S. PATENT DOCUMENTS

| | | | | |
|---|---|---|---|---|
| 3,554,721 A | * | 1/1971 | Gardner | 65/409 |
| 3,712,705 A | * | 1/1973 | Marcatili | 385/125 |
| 3,865,466 A | * | 2/1975 | Slaughter | 385/103 |
| 4,000,936 A | * | 1/1977 | Gloge | 385/102 |
| 4,415,230 A | * | 11/1983 | Keck | 350/96.33 |
| 4,681,399 A | * | 7/1987 | Hicks, Jr. | 385/123 |
| 5,566,196 A | * | 10/1996 | Scifres | 372/6 |
| 5,708,669 A | * | 1/1998 | DiGiovanni et al. | 372/6 |
| 5,841,797 A | * | 11/1998 | Ventrudo et al. | 372/6 |
| 6,031,849 A | * | 2/2000 | Ball et al. | 372/6 |
| 6,031,850 A | * | 2/2000 | Cheo | 372/6 |
| 6,370,164 B1 | * | 4/2002 | Islam | 372/6 |
| 6,373,868 B1 | * | 4/2002 | Zhang | 372/19 |
| 6,411,762 B1 | * | 6/2002 | Anthon et al. | 385/123 |
| 6,483,973 B1 | * | 11/2002 | Mazzarese et al. | 385/123 |

* cited by examiner

*Primary Examiner*—Don Wong
*Assistant Examiner*—Tuan N. Nguyen
(74) *Attorney, Agent, or Firm*—M. P. Williams

(57) ABSTRACT

A single core 35, 50 or a plurality of cores arranged in rings 21, 28, 29 around a central core 20, 27, or in an array 42, are provided with either or both of (a) a modal discrimination characteristic, including gain, index of refraction and cross sectional area, which is greatest in the center of the core or the array, and lowers outwardly therefrom, and (b) an oblong cross section, thereby to provide either or both of (c) a bright laser beam of the fundamental in-phase supermode, and/or (d) a linearly polarized output beam.

20 Claims, 3 Drawing Sheets

FIG.1
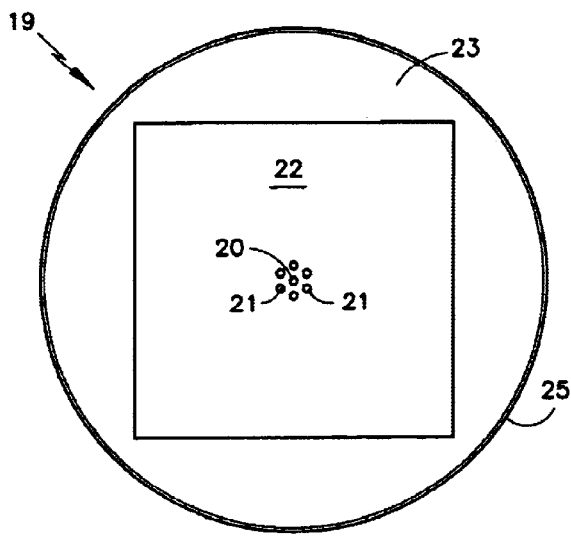
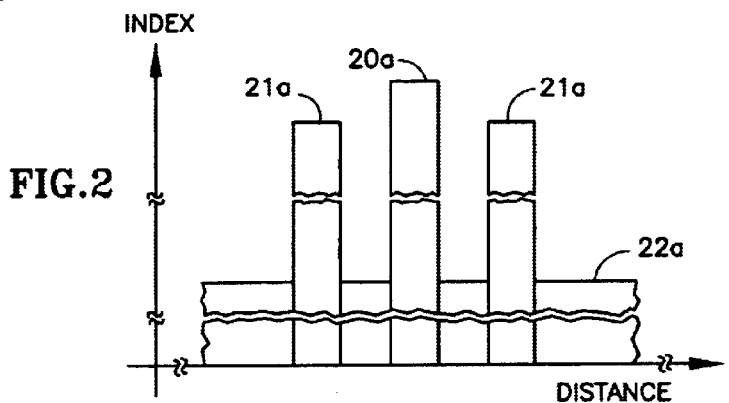
FIG.2
FIG.3
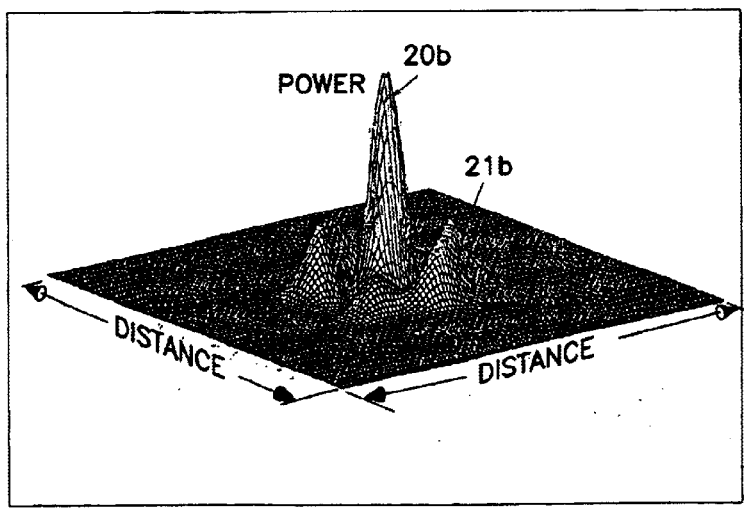

MODAL DISCRIMINATING AND LINEARLY POLARIZED FIBER LASERS

TECHNICAL FIELD

This invention relates to phase-locked fiber lasers that provide diffraction limited, high brightness and/or linearly polarized output laser beams, employing modal discriminating multiple cores and/or single or multiple oblong cores.

BACKGROUND ART

If the cores of a multi-core fiber laser array are configured in a hexagonal series of isometric rings, the evanescent-wave coupling among all adjacent emitters provides spontaneous phase locking so as to combine the power of all supermodes coherently into a single bright beam centered on the fiber axis, as is described in U.S. Pat. No. 6,031,850. Because a very strong evanescent-wave interaction over a very long fiber length, the double-clad multi-core fiber laser array is naturally phase-locked to emit all supermodes co-existing in the structure. In the case of a single isometric ring of six cores surrounding a central core, there exists five supermodes. In a large multicore phase-locked fiber laser system containing many isometric rings, there exists a very large number of supermodes, which can all oscillate within certain spectral or frequency locking range, when the pump power exceeds the lasing thresholds of these modes. Two methods commonly used to select a preferred mode from a multimode system are regulating the cavity width and spatially filtering out the unwanted modes. Both of these methods are useful only for low power lasers; for high power lasers, they are neither effective nor practical because a very high penalty must be paid by trading off output power for modal purity.

Prior art fiber lasers having multiple cores arranged in one or two isometric rings and doped with rare-earth ions can produce hundreds of thousands of watts of output power. The high-brightness beam size is typically on the order of 10 microns; therefore, the power density can be as high as $10^9$ W/cm$^2$, which far exceeds the power damage threshold of doped glass.

An important characteristic of multicore, phase-locked fiber lasers configured in an isometric geometry is that the polarization of the laser output is highly random. For many applications, a linearly polarized laser beam is desired. Use of polarization filters necessarily results in severe power reduction and loss of efficiency.

DISCLOSURE OF INVENTION

Objects of the invention include provision of a multicore phase-locked fiber laser array in which the fundamental, in-phase supermode is dominant, thereby emitting output power in a high-brightness and diffraction-limited laser beam; provision of a linearly polarized laser output from a clad-pumped, phase-locked fiber laser array; and provision of high laser power without high power densities which could damage the rare earth-doped fiber.

This invention is predicated in part on the discovery that it is very difficult or impossible to eliminate all the unwanted supermodes naturally existing in an isometric structure having equal mode-field coupling characteristics, under uniform index of refraction, gain, or dimension; therefore, the output power is distributed nearly equally among all allowed supermodes in a phase-locked fiber laser. Nonetheless, the output power can be altered by using a graded modal discriminating characteristic having the effect of increasing coupling toward the center of the array to thereby concentrate 90% or more of the power in a single, in-phase fundamental supermode at the center of the laser array. This invention is further predicated on the discovery that, although prior clad pumped single mode fiber lasers with circular cores provide output laser beams in which the polarization is highly randomly oriented, nonetheless, use of a non-circular core can remove the two-fold degeneracy of the HE$_{11}$ mode of a cylindrical fiber waveguide, thereby establishing a linearly polarized output.

According to the present invention, a plurality of cores doped with a rare earth lasing ion, within a common pump cladding, includes a central core and additional cores disposed outwardly of said central core, and having either or both of (a) an oblong cross section, thereby to provide a linearly polarized output laser beam, or (b) a mode discriminating characteristic, such as index of refraction, gain or cross sectional dimension, which is graded and being lower for the outward cores than the central cores, thereby to transfer laser power coherently into a bright laser beam of the fundamental in-phase supermode. According further to the invention, instead of an array of oblong cores, a single oblong core in a very large cladding may be utilized to provide a linearly polarized output beam. According to the invention further, utilization of a graded modal discrimination characteristic provides the ability to separate the cores by as much as five-fold more than in the prior art, such as with center-to-center spacings of 15 to 50 microns, whereby the laser power in a single bright beam can be spread over a greater area and thereby provide very high power without prohibitively high power densities.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a sectional, end elevation view of a seven-core, common clad fiber for a clad-pumped fiber laser, with sectioning lines omitted for clarity.

FIG. 2 is a broken away bar chart illustrating, not to a common scale, the index of refraction of the cores in the fiber of FIG. 1.

FIG. 3 is a perspective plot of laser power in a fiber laser according to FIGS. 1 and 2.

MODE(S) FOR CARRYING OUT THE INVENTION

Figure 4:
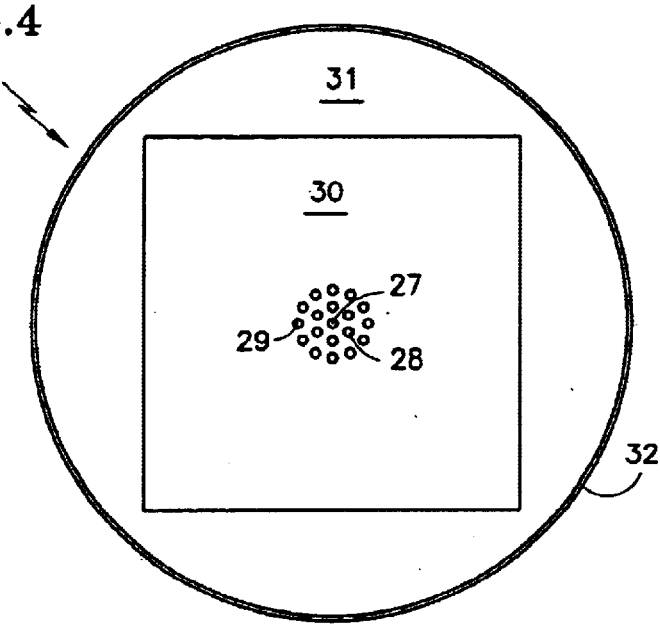
FIG. 4 is a sectional, end elevation view of a nineteen-core, common clad fiber for a clad-pumped fiber laser, with sectioning lines omitted for clarity.

Referring to FIG. 1, a loser fiber 19 comprises a plurality of doped fiber cores, including a central core 20 and a ring of six cores 21 forming an isometric pattern. The cores 20, 21 are surrounded by an inner, pump cladding 22 which is within an outer cladding 23, all of which is surrounded by a protective coating 25. According to the invention, the cores 21 are provided with an index of refraction which is less than the index of refraction of the core 20, as illustrated by the bars 21a end 20a, respectively, in FIG. 2. For example, the ring of FIG. 1 may have a V-value of 1.6 whereas the central core 27 may have a V-value of 2.4. Naturally, the inner, pump cladding 22 has a much lower index of refraction as illustrated by the bar 22a. The difference in the index of refraction of the cores 21 from that of the core 20 need only be on the order of 1% in order to accomplish approximately a two-fold increase in the power (20b in FIG. 3) of the in-phase fundamental supermode, in contrast with the power of the in-phase supermode achievable when the index of refraction is equal in all the cores, as is true in the prior art. Even though the difference in refractive indices between the cores is very slight, the wave guiding effect integrated over a very long fiber length produces a strong focusing of the power toward the central axis of propagation. The total output power comprises a coherent sum of five supermodes, the central beam representing the in-phase supermode containing more than half of the total power, as illustrated in FIG. 3.

In FIG. 4, a fiber laser 26 has a central core 27 surrounded by a first ring of six cores 28 which in turn is surrounded by a second ring of twelve cores 29. The cores are dispersed in pump cladding 30 surrounded by outer cladding 31 and a protective layer 32. With graded index of refraction as illustrated by the bar chart of FIG. 5, even though there is only a slight difference between the index of refraction 28a, 29a, of the inner and outer rings 27, 28, and only a small difference in the index of refraction 27a, 28a of the central core 27 and the first ring of cores 28, will nonetheless produce output power comprising a coherent sum of as many as 19 supermodes, with the central beam representing the in-phase supermode containing more than 90% of the total power, as illustrated in FIG. 6.

Figure 5:
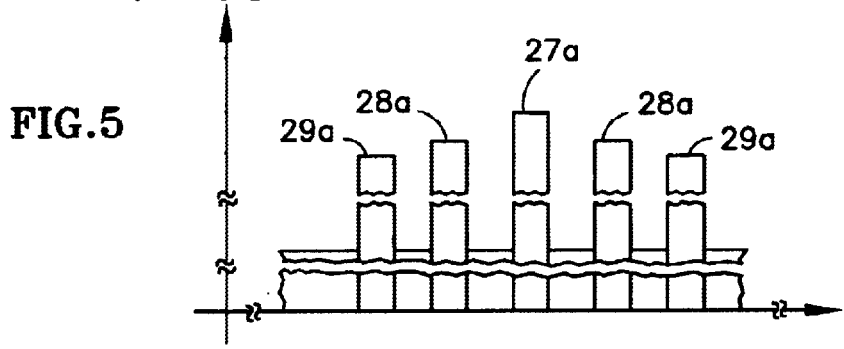
FIG. 5 is a broken away bar chart illustrating, not to common scale, the index of refraction of the cores in the fiber of FIG. 4.
Figure 6:
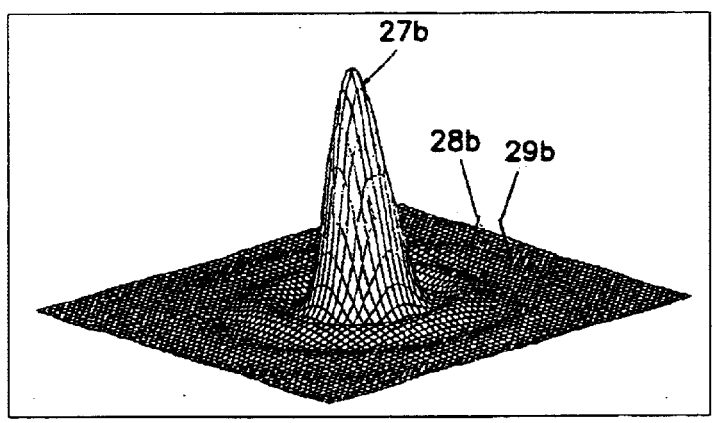
FIG. 6 is a perspective illustration of laser power in a fiber laser according to FIGS. 4 and 5.

The significant results indicated in FIG. 6 for graded index of refraction as illustrated in FIG. 5 results because more gradations in the index profile creates a smoother grading, and it also extends the mode-fields of the outer rings further into the cladding (the waves spread out). As a result, both the beam intensity and the beam size of the in-phase fundamental supermode (27b) are increased at the expense of reducing the intensities of higher-ordered supermodes (28b, 29b). A change in the refractive index can be accomplished by changing either the dopants or the doping concentrations in the silica network. For example, when $GeO_2$ dopant is introduced into borosilicate glass, it will change the refractive index by about 1.2%. This is usually accomplished by hydrolyzing a mixture of $SiCl_4$ and $O_2$ with an additive such as $GeCl_4$ vapor to produce Ge doped $SiO_2$ deposited on a pure $SiO_2$ substrate. There are other mixtures, known in the art of modifications of glass network, which can also be used to produce a variation in refractive index. Therefore, a graded index profile, as shown in FIGS. 2 and 5, between the isometric rings can readily be made to re-distribute the laser power accordingly towards the center of the concentric rings.

A similar effect can be achieved by varying the doping concentration of the stimulating (lasing) ions such as $Yb^{3+}$ and $Er^{3+}$ or both in a codoped system. This will provide a graded gain which will concentrate the power, but results in lower overall gain.

Another way in which the power of the various supermodes can be transferred into the in-phase fundamental supermode, as illustrated in FIGS. 3 and 6 is to have a gradation in the core dimension (such as diameter). This also will provide a concentration of power of the supermodes in a single, in-phase fundamental supermode as illustrated in FIGS. 3 and 6, but also results in lower overall gain. Therefore, the preferred method of implementing the present invention is to provide cores having a graded index of refraction.

A feature of the invention is that grading of the index of refraction or dimension of the cores as described hereinbefore has the effect of extending the mode-fields further into the cladding. Because of this, the cores can then be located much further from each other (as much as five-fold) without significant reduction in the evanescent-wave interaction between the cores over a long fiber length. According to the invention, the center-to-center spacing of the cores may be between 15 and 50 microns. In such a case, the single, concentrated beam of power may nonetheless be spread across, say, 15–40 microns or so, compared to 10 microns of the prior art, thus reducing the power density while increasing the power.

Figure 7:
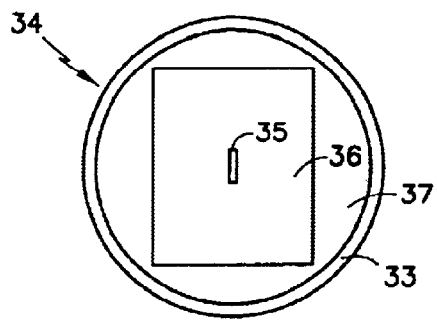
FIG. 7 is a sectional, end elevation view of a fiber for a clad-pumped fiber laser, having a single oblong core, with sectioning lines omitted for clarity.

Referring to FIG. 7, a polarized fiber laser 34 includes a single core 35, doped with rare-earth ions, configured in the shape of a narrow rectangle, with an aspect ratio of at least two between the length and width. The core is embedded in a large pump cladding 36 which in turn is within an outer cladding 37, all of which is covered by a protective layer 33. In a rectangular core, the allowed characteristic modes are the transverse-electric $TE_0$ end the transverse-magnetic $TM_0$ modes. Because the refractive index of the core is greater than that of the clad, the resulting property of the rectangular waveguide formed by the core 35 is that a larger portion of power propagating in the pump cladding 36 is the $TM_0$ modal power, rather than the $TE_0$ modal power. Since the loss in the cladding is always much larger than that in the core, the propagation loss for the $TM_0$ mode is larger than that for the $TE_0$ mode so that, over a very long fiber length, only the $TE_0$ mode can survive. Furthermore, a core of an oblong shape (non-circular) will remove the two-fold degeneracy of the $HE_{11}$ mode of a cylindrical fiber waveguide. Therefore, the laser output contains only the linearly polarized $TE_0$ mode with a polarization oriented along the longer axis of the rectangular core 35. The core 35 need not be rectangular, so long as it is oblong, and may for instance be slightly rounded or highly elliptical.

Figure 8:
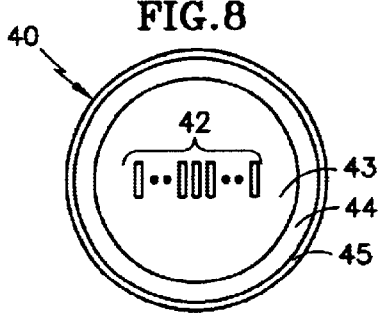
FIG. 8 is a sectional, end elevation view of a fiber having an array of oblong cores, with sectioning lines omitted for clarity.
Figure 9:
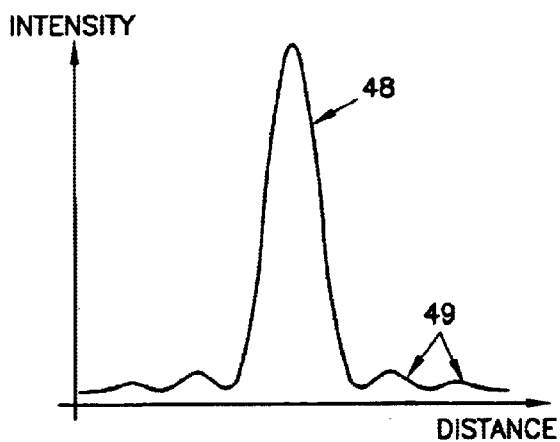
FIG. 9 is a plot of output laser power of a fiber laser according to FIG. 8.

In FIG. 8, a polarized fiber laser 40 includes a plurality of rectangular cores 42 within a circular pump clad 43 which is surrounded by outer cladding 44 and a protective layer 45. The cores 42 form a phase-locked linear array and provides a linearly polarized, high-brightness laser beam 48, FIG. 9, located at the center of the array, with a series of small side lobes 49.

Figure 10:
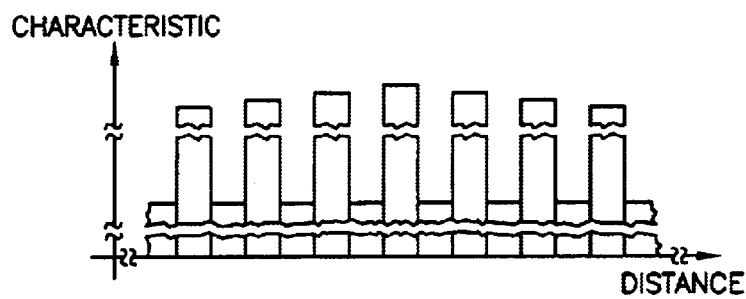
FIG. 10 is a broken away bar chart illustrating a graded characteristic which may be employed in a fiber laser according to FIG. 8.

The array of FIG. 8 may be provided with a graded modal discriminating characteristic, as illustrated in FIG. 10, which may be either a gradation in index of refraction, gain, or core dimension. In such a case, substantially all of the power will be in a single, central beam.

Figure 11:
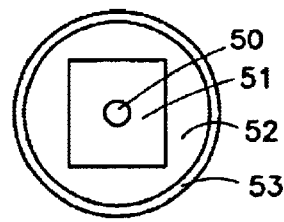
FIG. 11 is a sectional, end elevation view of a single core double clad fiber for a clad-pumped fiber laser, with sectioning lines omitted for clarity.
Figure 12:
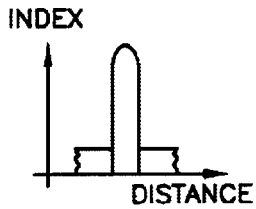
FIG. 12 is a broken away bar chart illustrating, not to any scale, the index of refraction of the core in the fiber of FIG. 11.

In FIG. 11, a single core 50, doped with a rare-earth lasing ion, is within a pump cladding 51 surrounded by outer cladding 52 and a protective layer 53. The core 50 is large, on the order of 50 microns, and has a graded characteristic, such as index of refraction, which is largest in the center and is progressively lower toward the periphery, as is illustrated in FIG. 12.

In all of the embodiments herein, the cross sectional shape of the pump cladding 22, 29, 36, 43 is optional. It is simplest to use round cladding 43 (FIG. 8). Rectangular cladding 36 (FIG. 7) that is not square assists in absorbing more of the pump power. But square/rectangular cladding 22, 29 (FIGS. 1 and 4) works well and is relatively simple. Thus, the various aspects of the invention may be practiced with variously shaped cladding as is desired in any implementation thereof.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

What is claimed is:

1. A clad-pumped, double clad, fiber laser, comprising:
one or more cores disposed within a pump cladding;
each doped with a rare earth lasing ion;
each having an oblong cross section;
there being either (a) a single core disposed at the center of said cladding or (b) a central core disposed at the center of said cladding and additional cores disposed outwardly of said central core, oriented in an array along a line inclusive of the center of said cladding with long axes of said central core and said additional cores perpendicular to said line and with an equal distance between the centers of adjacent cores;
thereby to provide a linearly polarized output laser beam;
each of said one or more cores having a mode discriminating core characteristic selected from (c) index of refraction, (d) gain, and (e) cross sectional dimension, said characteristic, in a fiber having a said single core, being greatest at the center of said single core and progressively lower toward the periphery of said single core, said characteristic of said central core, in a fiber having said additional cores, being greater than said characteristic of all others of said cores, said characteristic of each one of said other cores being lower than said characteristic of any of said cores that are closer to said central core than said one of said cores;
thereby causing radiation in said cores to phase-lock and transfer laser power coherently into a linearly polarized, bright laser beam of the fundamental in-phase supermode from all higher order supermodes belonging to the same array structure.

2. A clad-pumped, double clad, fiber laser, comprising:
one or more cores disposed within a pump cladding;
each of said one or more cores doped with a rare earth lasing ion;
there being either (a) a single core disposed at the center of said cladding or (b) a central core disposed at the center of said cladding and additional cores disposed outwardly of said central core;
each of said one or more cores having a modal discriminating core characteristic selected from (c) index of refraction, (d) gain, and (e) cross sectional dimension, said characteristic, in a fiber having said single core, being greatest at the center of said single core and progressively lower toward the periphery of said single core, said characteristic of said central core, in a fiber having said additional cores, being greater than said characteristic of all others of said cores, said characteristic of each one of said other cores being lower than said characteristic of any of said cores that are closer to said central core than said one of said cores;
thereby causing radiation in said cores to phase-lock and transfer laser power coherently into a bright laser beam of the fundamental in-phase supermode from all higher order supermodes belonging to the same array structure.

3. A laser according to claim 2 wherein:
there are a plurality of cores with the center to center spacing of said cores being between 15 and 50 microns.

4. A laser according to claim 2 wherein:
the cross section of said pump cladding is circular.

5. A laser according to claim 2 wherein:
the cross section of said pump cladding is rectangular.

6. A laser according to claim 2 wherein:
each core has an oblong cross section;
there being either (f) only one core or (g) a plurality of cores oriented in an array along a line inclusive of the center of said cladding with their long axes perpendicular to said line and with an equal distance between the centers of adjacent cores;
thereby to provide a linearly polarized output laser beam.

7. A laser according to claim 2 wherein:
there is only one core.

8. A laser according to claim 2 wherein:
there are a plurality of said cores are arranged isometrically in at least one ring surrounding said central core.

9. A laser according to claim 8 wherein:
there is only one ring of six cores surrounding said central core.

10. A laser according to claim 8 wherein:
there is a first ring of six cores surrounding said central core and a second ring of twelve cores surrounding said first ring.

11. A laser according to claim 2 wherein:
said characteristic is index of refraction.

12. A laser according to claim 2 wherein:
there are a plurality of cores and said characteristic is gain.

13. A laser according to claim 2 wherein:
there are a plurality of cores and said characteristic is cross sectional dimension.

14. A clad-pumped, double clad, fiber laser, comprising:
one or more cores disposed within a pump cladding;
each of said a plurality cores doped with a rare earth lasing ion;
each of said cores having an oblong cross section;
there being a central core disposed at the center of said cladding and additional cores disposed outwardly of said central core, oriented in an array along a line inclusive of the center of said cladding with their long axes perpendicular to said line and with an equal distance between the centers of adjacent cores;
thereby to generate, when optically pumped, a single linearly polarized $TE_0$ mode output laser beam.

15. A laser according to claim 14 wherein:
there are a plurality of cores with substantially the same cross sectional area as each other of said cores.

16. A laser according to claim 14 wherein:
there are a plurality of cores with substantially the same refractive index.

17. A laser according to claim 14 wherein:
there are a plurality of cores, said cores having a characteristic selected from (a) index of refraction, (b) gain, and (c) cross sectional dimension, said characteristic of said central core being greater than said characteristic of all others of said cores, said characteristic of each one of said other cores being lower than said characteristic of any of said cores that are closer to said central core than said one of said cores;

thereby causing radiation in said cores to phase-lock and transfer laser power coherently into a bright laser beam of the fundamental in-phase supermode from all high order supermodes belonging to the same array structure.

18. A laser according to claim 14 wherein:
there are a plurality of cores, the center to center spacing of said cores is between 15 and 50 microns.

19. A laser according to claim 14 wherein:
said pump cladding has a circular cross section.

20. A laser according to claim 14 wherein:
each core is rectangular.

* * * * *